United States Patent Office 2,723,247
Patented Nov. 8, 1955

---

2,723,247

ETHYLENE OXAMATES AND ACRYLONITRILE POLYMER SOLUTIONS IN SAME

Robert C. Harrington, Jr., Kingsport, Tenn., assignor to Eastman Kodak Company, Rochester, N. Y., a corporation of New Jersey No Drawing. Application October 30, 1951,
Serial No. 253,955

11 Claims. (Cl. 260—30.4)

This invention relates to a new class of compounds, to a method of making these compounds, to a new composition of matter using these compounds, to shaped articles produced therefrom, and to methods of making such articles. More particularly, the invention relates to ethylene oxamates having the formula:

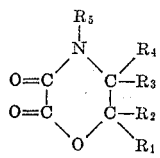

where $R_1$, $R_2$, $R_3$, $R_4$ and $R_5$ are selected from the group consisting of hydrogen, lower alkyl, hydroxy lower alkyl, and aryl radicals, and to polyacrylonitrile (polymerized vinyl cyanide), and copolymers, interpolymers, and graft polymers of polyacrylonitrile in solution in, or plasticized with, compounds of this formula.

Since polymers of acrylonitrile, including the homopolymers, graft polymers, interpolymers, and copolymers thereof, are known to possess many desirable chemical and physical properties, such as insolubility in the common organic solvents, including acetone, methanol, ethanol, ethyl ether, ethyl acetate, benzene, toluene, ethylene dichloride, etc., insensitivity to these solvents, and unusual toughness and moisture regaining properties, many attempts have been made to find solvents which could be utilized to spin these polymers into fibers. Inorganic salts, such as zinc chloride, lithium bromide and sodium sulfocyanide, have previously been proposed for this purpose. However, fibers spun by extrusion of these solutions into coagulating baths which are non-solvents for polyacrylonitrile or copolymers of acrylonitrile, such as water, dilute acid solutions, glycerol, etc., usually contain large amounts of these salts. The fibers containing these salts are not uniform and possess poor physical properties, and even where it is possible to eliminate these salts from the fiber, the fibers become weak, spongy or brittle. Some of these salts have the further undesirable property of causing the fibers to have a tacky consistency, which results in the individual filaments sticking together to give an extremely brittle, inflexible fiber having many of the characteristics of a monofilament. U. S. Patents 2,404,713 to 2,404,728 propose to use various organic compounds as solvents for polymers of acrylonitrile and show how solutions of these polymers can be used to spin fibers which do not possess the undesirable properties that result from the use of inorganic salts.

I have now discovered a new group of organic compounds which are novel per se and are useful as solvents and plasticizers for polymers of acrylonitrile, where the polymer molecule contains a major proportion, and preferably at least 80% of polyacrylonitrile, and that these solutions can be used to advantage in the preparation of fibers, films, molded objects, and other shaped articles.

It is an object of my invention to provide a new class of compounds having the formula:

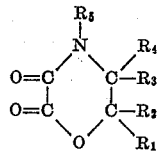

where $R_1$, $R_2$, $R_3$, $R_4$ and $R_5$ are selected from the group consisting of hydrogen, lower alkyl, hydroxy lower alkyl, and aryl radicals. Another object is to provide a process for making these new compounds. A further object of this invention is to provide these compounds for incorporating with, as a solvent or plasticizer, polymers of acrylonitrile. A further object is to provide a new class of solvents which are cheaply and easily prepared from readily available raw materials. Another object is to provide solutions of polymers of acrylonitrile in these new solvents, which can be used advantageously in the wet and dry spinning of fibers and in the formation of other shaped articles. Still another object of the invention is to provide improved methods of forming synthetic filaments, molded articles and the like from acrylonitrile. These and other objects of the invention will be more apparent after consideration of the following specification.

The novel compounds of my invention are prepared by an efficient, yet previously unknown reaction, comprising reacting a dialkyl oxalate such as diethyl oxalate with the appropriate olamine compound, and removing two mole proportions of aliphatic alcohol, for example, ethyl alcohol. The reaction apparently takes place as follows:

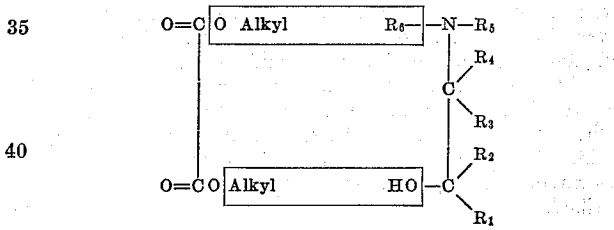

where $R_1$, $R_2$, $R_3$, $R_4$, $R_5$ and $R_6$ are selected from hydrogen or lower alkyl, hydroxy lower alkyl, and aryl radicals. A small piece of metallic sodium may be used to catalyze the reaction. The lower alkyl oxalates are preferable for this reaction.

The compound obtained is then purified either by gentle heating under high vacuum to remove last traces of the aliphatic alcohol and unreacted starting materials, or by recrystallization, depending upon the nature of the compound.

The following examples illustrate preparation of the new types of compounds by this reaction:

Example I.—Preparation of N-methyl ethylene oxamate

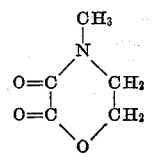

A total of 75 grams (1 mole) of N-methyl ethanolamine is added to 146 grams (1 mole) of diethyl oxalate in a flask fitted with a column and a still head. The mixture is heated until ethanol commences to distill, and after about one-half of the theoretical amount has been brought over, a large portion of the remainder is removed under high vacuum. In this part of the process, the pot temperature is not allowed to exceed 150° C.

The mixture is next heated at 100° C. for about 2 hours, at the end of which time most of the impurities have been distilled off. The residue is a syrupy fluid consisting of N-methyl ethylene oxamate which is a good solvent for carylonitrile polymers and copolymers of the class previously described.

*Example II.—Preparation of N-phenyl ethylene oxamate*

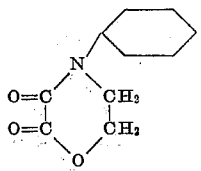

A total of 137 grams (1 mole) of N-phenyl ethanolamine is added to 146 grams (1 mole) of diethyl oxalate in a flask fitted with a column and a still head. Approximately two-thirds of the theoretical amount of ethanol is removed by distillation, and the residue recrystallized from ethanol. White flakes of N-phenyl ethylene oxamate are obtained which melt at 158–159° C. This compound is a good solvent for acrylonitrile polymers and copolymers of the type previously described.

*Example III.—Preparation of ethylene oxamate*

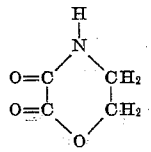

A total of 61 grams (1 mole) of ethanolamine is added to 146 grams (1 mole) of diethyl oxalate in a flask fitted with a column and a still head. This mixture is heated until ethanol commences to distill, and after about half the theoretical amount has been brought over, the residue in the still pot is cooled. Crystals of ethylene oxamate then separate and are later collected by filtration. These crystals can then be purified by recrystallization in some suitable solvent such as ethanol. When pure and dry, the ethylene oxamate has a melting point of 150–154° C., and is a solvent for acrylonitrile polymers and copolymers of the class previously described.

*Example IV.—Preparation of N-(β-hydroxyethyl) ethylene oxamate*

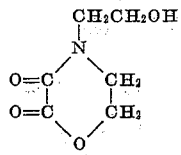

One mole (105 grams) of diethanolamine is added to 146 gram (1 mole) of diethyl oxalate in a flask fitted with a column and still head. This mixture is heated until reaction commences, and alcohol distilled off under vacuum as long as there is no tendency for the mixture in the stillpot to decompose. After as much ethanol as possible has been removed, the residue in the pot is removed and used as crude N-(β-hydroxyethyl) ethylene oxamate. This syrupy liquid is a solvent for acrylonitrile polymers and copolymers of the class previously described.

*Example V.—Preparation of 2,2-dimethyl ethylene oxamate*

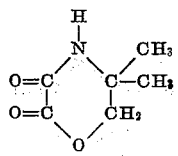

One mole (89 grams) of 2,2-dimethyl ethanolamine is added to 146 grams of diethyl oxalate in a flask fitted with a column and still head. The reaction is started by heating, and about half the theoretical amount of ethanol removed by distillation. At the end of this time, the residue in the still pot is cooled and 2,2-dimethyl ethylene oxamate crystallizes out. This compound may be purified by recrystallization from ethanol, and when this purifier compound has dried, it has a melting point of 155° C. This compound is a good solvent for acrylonitrile polymers and copolymers of the class previously described.

The invention is not to be considered as limited to the specific compounds given in the preceding examples, as they have been set forth merely as illustrative of the invention. The type reaction set forth proceeds quite readily with members of the broad class of compounds specified, to provide a variety of good solvents for the polyacrylonitrile polymers with which the invention is concerned.

In the case of solid products, they may be recovered from the reaction medium by filtration with no further processing, or they may be leached out by hot solvents, such as ethanol, and then recovered by crystallization. In the case of liquids, however, the two mole proportions of aliphatic alcohol are removed, after which the crude residue can be used. It is advantageous in such case to distill the liquid to obtain a product which is colorless, and which shows more powerful solvent action due to its higher purity.

The compounds of the invention are readily tailored to be substantially water insoluble, and thus suitable as plasticizers. N-phenyl ethylene oxamate is a good example of such agent.

The polymer solutions are prepared by adding the powdered polymer or copolymer to the warm liquid solvent and stirring until solution is complete. Alternatively, the solvent and the polymer can be intimately mixed by using a Waring Blender, mixing rolls or the like, followed by heating, preferably under pressure. The temperature to which the solvent mixture is heated may vary from about 75 to 200° C. depending on the solvent. Polymer solutions intended for various uses and having different viscosities and other characteristics may be prepared by varying the solids content of the solutions.

Polyacrylonitrile solutions prepared by using the solvents set forth above form filaments when extruded through a filament forming orifice into a suitable coagulating medium in either a wet or dry process. As is well known, these processes involve the use of evaporative or solvent exhausting media such as alcohol, steam, air, or others which are well known in the art.

Examples of the use of solutions of polyacrylonitrile in ethylene oxamates for making are as follows:

*Example A*

About 10 parts by weight of powdered polyacrylonitrile are stirred into 100 parts of N-methyl ethylene oxamate which had been heated to about 150° C. Any temperature from the melting point of the solvent up to about 200° C. would be satisfactory. A smooth, pourable solution results.

This solution is extruded at about 150° C. through a spinneret into a coagulating bath of isopropanol maintained at about 25° C. to form a filament or thread of polymeric acrylonitrile. Such filaments may be given such further known physical treatment such as stretching, treatment with various liquids, and the like, as may be desired.

Films are produced when the hot solution is poured onto a warm surface, such as glass, followed by immersion in a hot solvent for the ethylene oxamate compound, for example, isopropanol, at about 10° C.

Other examples could be given using the other compounds set forth in Examples I–V, the only difference being that the solid solvents are melted before use. Likewise, other compounds coming within the generic formula given herein are similarly used with success. It is to be understood that the examples which have been set forth are given merely in an illustrative sense, as the invention is not limited thereto.

Polyacrylonitrile solutions made in accordance with the invention can also be extruded as tapes, bars, rods and other desired configurations.

After use of the solvents of the invention, they may be readily recovered from the coagulating medium. Where the solvent is a solid normally, it can be crystallized out of the medium on cooling, after concentrating, and can be separated as by filtration or centrifuging for re-use in the process. The normally liquid solvents are higher boiling than the coagulating media normally used, and are readily recovered by distillation techniques wherein the coagulating media are distilled from them. Due to their stability to heat, the solvents of this class are left substantially unchanged as the residue after such distillation. This ease of recovery, by permitting re-use, renders this class of solvents quite economical.

Molded articles may be formed from the solutions described above by the use of any suitable molding procedure known to the art.

The solvents which are the subject matter of my invention have been found to be highly useful and advantageous over many previously known solvents, particularly because of their improved stability, ease of recovery, ease of production, low cost, good shelf life, and ability to withstand relatively high temperatures without noticeable degradation.

Various types of modifying agents can be added to the solutions made as described above, for example, proteins, cellulose organic acid esters, cellulose ethers, polyamides, polyesters, vinylpolymers, etc.

I claim:

1. As a new composition of matter, a polymer of acrylonitrile containing in the polymer molecule at least a major proportion by weight of acrylonitrile, incorporated with an ethylene oxamate having the formula:

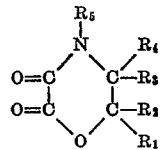

where $R_1$, $R_2$, $R_3$, $R_4$ and $R_5$ are selected from the group consisting of hydrogen, lower alkyl, hydroxy lower alkyl, and aryl radicals.

2. As a new composition of matter, a polymer of acrylonitrile containing in the polymer molecule at least 80% by weight of acrylonitrile, dissolved in an ethylene oxamate having the formula:

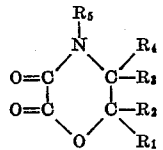

where $R_1$, $R_2$, $R_3$, $R_4$ and $R_5$ are selected from the group consisting of hydrogen, lower alkyl, hydroxy lower alkyl, and aryl radicals.

3. As a new composition of matter, a polymer of acrylonitrile containing in the polymer molecule at least 80% by weight of acrylonitrile dissolved in N-methyl ethylene oxamate.

4. As a new composition of matter, a polymer of acrylonitrile containing in the polymer molecule at least 80% by weight of acrylonitrile dissolved in N-phenyl ethylene oxamate.

5. As a new composition of matter, a polymer of acrylonitrile containing in the polymer molecule at least 80% by weight of acrylonitrile dissolved in ethylene oxamate.

6. As a new composition of matter, a polymer of acrylonitrile containing in the polymer molecule at least 80% by weight of acrylonitrile dissolved in N-($\beta$-hydroxyethyl) ethylene oxamate.

7. As a new composition of matter, a polymer of acrylonitrile containing in the polymer molecule at least 80% by weight of acrylonitrile dissolved in 2,2-dimethyl ethylene oxamate.

8. The method of forming synthetic filaments, comprising dissolving polyacrylonitrile in a liquid solvent comprising an ethylene oxamate having the formula:

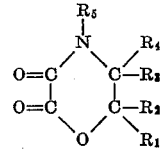

where $R_1$, $R_2$, $R_3$, $R_4$ and $R_5$ are selected from the group consisting of hydrogen, lower alkyl, hydroxy lower alkyl and aryl radicals, and forcing the solution through a filament forming orifice into a medium capable of coagulating the filaments.

9. A method of forming a molded article comprising dissolving polyacrylonitrile in a solvent comprising an ethylene oxamate having the formula:

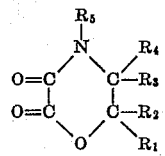

where $R_1$, $R_2$, $R_3$, $R_4$ and $R_5$ are selected from the group consisting of hydrogen, lower alkyl, hydroxy lower alkyl, and aryl radicals, and then molding a shaped article from the solution.

10. A process for making an ethylene oxamate having the formula

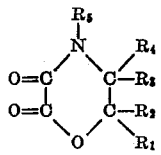

comprising reacting a compound of the general formula HO—$CRR_1CR_2R_3NR_4R_5$ where R, $R_1$, $R_2$, $R_3$, $R_4$ and $R_5$ are selected from the group consisting of hydrogen, lower alkyl, hydroxy lower alkyl, and aryl radicals, with a dialkyl oxalate, the reaction being carried out by heating together equimolar quantities of the reactants to a temperature at which lower aliphatic alcohol formed off in the course of the reaction is distilled off.

11. A process according to claim 10 wherein metallic sodium is used as a catalyst for the reaction.

References Cited in the file of this patent

UNITED STATES PATENTS

| | | |
|---|---|---|
| 2,023,872 | Cox et al. | Dec. 10, 1935 |
| 2,040,039 | Bruson | May 5, 1936 |
| 2,529,449 | Ham | Nov. 7, 1950 |
| 2,580,393 | Beaman | Jan. 1, 1952 |
| 2,607,751 | Flanagan | Aug. 19, 1952 |

OTHER REFERENCES

Journal of the American Chemical Society, vol. 70, 1948, page 438.

Helvetica Chimica Acta, vol. 31 (1948), pages 666 and 2195.

Nature, vol. 162 (1948), page 61.

Annalen der Chemie, vol. 369 (1909), page 260.